(12) United States Patent
Rana

(10) Patent No.: US 8,631,343 B1
(45) Date of Patent: Jan. 14, 2014

(54) AUTOMATICALLY DESIGNATING DOCUMENT ITEMS, SUCH AS REFERENCES TO OTHER DOCUMENTS, FOR IMPROVED NAVIGATION AND/OR RETRIEVAL

(75) Inventor: Kulpreet Rana, Bainbridge Island, WA (US)

(73) Assignee: Google Inc., Mountain View, CA (US)

( * ) Notice: Subject to any disclaimer, the term of this patent is extended or adjusted under 35 U.S.C. 154(b) by 2343 days.

(21) Appl. No.: 11/172,435

(22) Filed: Jun. 30, 2005

(51) Int. Cl.
*G06F 3/048* (2013.01)

(52) U.S. Cl.
USPC .......................................... 715/781; 715/764

(58) Field of Classification Search
USPC ........................................................ 707/5, 2
See application file for complete search history.

(56) References Cited

U.S. PATENT DOCUMENTS

| | | | | |
|---|---|---|---|---|
| 6,023,726 A | * | 2/2000 | Saksena | 709/219 |
| 6,405,192 B1 | * | 6/2002 | Brown et al. | 707/3 |
| 2001/0039546 A1 | * | 11/2001 | Moore et al. | 707/10 |
| 2002/0147788 A1 | * | 10/2002 | Nguyen | 709/217 |
| 2002/0163545 A1 | * | 11/2002 | Hii | 345/838 |
| 2006/0070012 A1 | * | 3/2006 | Milener et al. | 715/822 |
| 2006/0161541 A1 | * | 7/2006 | Cencini | 707/5 |
| 2006/0253459 A1 | * | 11/2006 | Kahn et al. | 707/10 |

* cited by examiner

*Primary Examiner* — Omar Abdul-Ali
(74) *Attorney, Agent, or Firm* — Straub & Pokotylo; John C. Pokotylo

(57) ABSTRACT

Referenced items (e.g., search results, ads, etc.) on a document may be designated automatically. Alternatively, or in addition, a user can designate more than one reference without needing to repeat a designation input. The designated item references may be rendered persistently (e.g., constantly displayed), perhaps as separate tabs. A user could then select a persistent item reference, and the referenced item would be rendered to the user.

27 Claims, 11 Drawing Sheets

AUTOMATICALLY DESIGNATING DOCUMENT ITEMS, SUCH AS REFERENCES TO OTHER DOCUMENTS, FOR IMPROVED NAVIGATION AND/OR RETRIEVAL

§1. BACKGROUND OF THE INVENTION

§1.1 Field of the Invention

The present invention concerns accessing information. In particular, the present invention concerns accessing information in an environment including referenced documents, such as the World Wide Web (referred to as "the Web") for example.

§1.2 Background Information

Hyperlinks have made finding documents on a network easier. Indeed, hyperlinks are part of the foundation of the Web. A "hyperlink" (or simply a "link") is a reference in a hypertext document to another document or other resource. Thus, it is similar to a citation in literature. However, combined with a data network and suitable access protocol, it can be used to fetch the referenced document or resource. The fetched document or resource can then be saved, viewed, or displayed as part of the referencing document.

For example, HTML documents use hyperlinks to link units of information to other units of information over the Internet. Links are specified in HTML using the <a> (anchor) elements. In the context of HTML, a link has two ends (called "anchors") and a direction. The link starts at the source anchor and points to the destination anchor. However, the term "link" is often used for the source anchor, while the destination anchor is called the "link target." A common link target is a URL used in the Web. This can refer to a document, e.g. a Web page, or other resource, or to a position in a Web page. The latter is achieved by means of a HTML element with a "name" or "id" attribute at that position of the HTML document. The URL of the position is the URL of the Web page with "#attribute name" appended.

Users can explore related documents by selecting (e.g., with a left mouse click) links, which take them from a document to a target document identified by the destination anchor of a link. Web browsers, such as Navigator from AOL-Time Warner, Explorer from Microsoft, Firefox from Mozilla, Opera from Opera Software, etc., provide "forward" and "back" buttons to help users navigate among documents.

Although navigating among documents using links and "forward" and "back" buttons help people find information of interest on the Web, additional tools have made finding desired information even easier. For example, search engines, such as the Google search engine from Google of Mountain View, Calif. provide links to documents relevant to a user search query. Further, since people often use the Internet for shopping, advertisements with links to advertiser Websites or Web pages may be useful, particularly if such ads are targeted to a present user interest (e.g., AdWords from Google provides ads targeted to keywords from search queries, and AdSense from Google provides ad targeted to content of a document).

Unfortunately, browsing search results or ads using a browser like Explorer from Microsoft is not as convenient as it could be, particularly if the user is interested in more than one item. For example, in the context of search result pages, typically, the user navigates from the search results page to a particular result of interest. Using a browser like Explorer from Microsoft, if the user wants to go to another result of interest, they must (1) navigate back to the search results page and (2) follow a link to the other result. A similar problem arises in the context of ads. For example, suppose a user is interested in buying an MP3 player. Upon conducting a search, the person would be presented with a search results Web page that includes a set of ads for Websites that sell MP3 players. It is cumbersome to require the user to navigate to each advertiser Website separately, then back to the search results Web page, then back to another advertiser Website, etc.

There exist some mechanisms for browsing search results serially. For example, the Google toolbar from Google of Mountain View, Calif. has "previous" and "next" buttons that can be used to navigate from one search result to the next. One limitation with this approach is that it forces the user to browse through search results serially, in the order presented. Such indiscriminant browsing may force the user to navigate to Web pages that they have no interest in. This would be a detriment to advertisers who were paying for each rendering of one of their pages to a user since the user might load (navigate through) pages of no interest to them to get a later page of interest. Another limitation with this approach is that because only one result is presented to the user (i.e., "rendered") at a time, each Web page needs to be loaded when the user wants to view it, which can slow the user's browsing experience.

Another mechanism to improve Web browsing is the ability to open a link in a new window. For example, the Firefox browser from Mozilla supports so-called "tabbed browsing." Using such a tabbed-browsing enabled browser, a user can control-click links to have these links opened into new tabs. The Webpage referenced in the link is fetched, even if the user does not immediately select the link or tab. Unfortunately, however, mouse-over, control-click operations may be cumbersome, and may become annoying to some users, particularly if such operations are repeated over multiple links.

The opera browser allows users to define a list of URLs corresponding to Webpages that will automatically be loaded into tabs whenever the browser is launched. However, this requires the user to know, in advance, what Webpages they will want tabbed. Therefore, such automatic loading and tabbing of Webpages using a predefined list not useful for Webpages with links to Webpages that the user is not familiar with.

In view of the foregoing, it would be useful to improve browsing items, such as search results or ads for example, particularly in instances in which a user will likely be interested in more than one item.

§2. SUMMARY OF THE INVENTION

At least some embodiments consistent with the present invention automatically designate one or more search results, ads, or other items on a Web Page. Designated items may then be automatically loaded for viewing. Such automatic designations could be used instead of, or in addition to manual user designations.

Whether or not to automatically designate an item may be determined using one or more of various factors. In some embodiments consistent with the present invention, one factor may be whether or not a user has a preference for automatic designations, or perhaps preferences for automatic designations of certain types of items (e.g., sets of ads, sets of search results, etc.). Such a preference may be provided by the user expressly, and/or may be inferred from past user behavior. In some embodiments consistent with the present invention, one factor may be a relevance (e.g., to information of a user search query, from concepts or topics of a presently loaded document, etc.) of the linked item. In some embodiments consistent with the present invention, one factor may be a score of an advertisement. The score may reflect one or more of a relevance of the ad (e.g., to search query information, to contents of a Webpage, to a location, to a user, to a client device type, etc.), offer information (e.g., a bid) associated with the ad, past performance of the ad (e.g., a selection-to-impression ratio, a conversion-to-impression ratio, etc.), etc.

In at least one embodiment consistent with the present invention, the designated item references could be rendered or displayed persistently, for example as separate tabs, links, other windows, etc.

In at least some embodiments consistent with the present invention, a user can designate multiple items without the need to repeat a designation input (or designation input sequence).

Still another implementation consistent with the present invention could automatically de-designate a designated item in certain situations, which would remove the persistent reference to that item. Embodiments consistent with the present invention could use manual de-designation only, automatic de-designation only, or both.

§3. BRIEF DESCRIPTION OF THE DRAWINGS

§4. DETAILED DESCRIPTION

Figure 1:
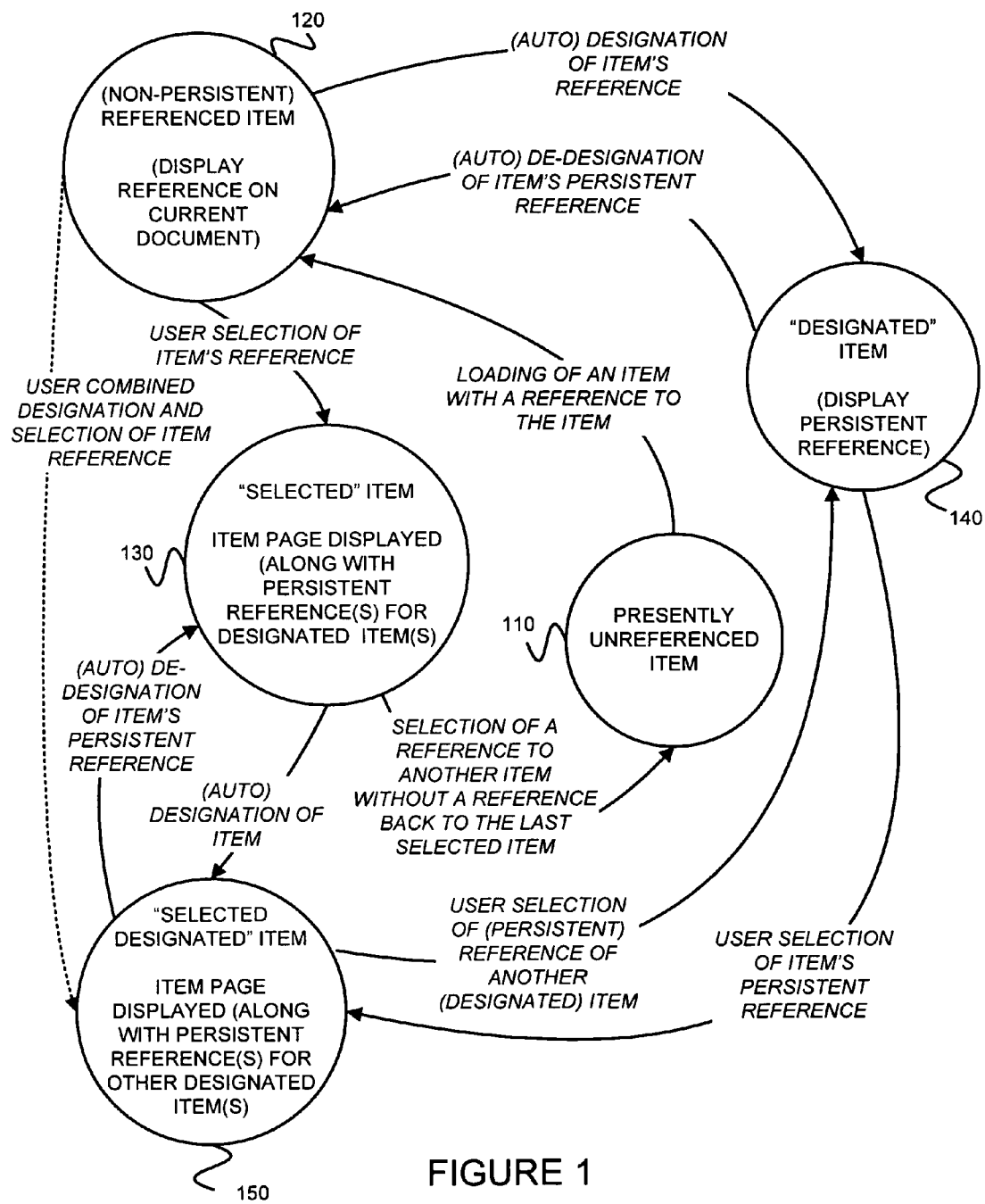
FIG. 1 is a state diagram illustrating possible item (e.g., document) states.

The present invention may involve novel methods, apparatus, message formats, and/or data structures for facilitating information access in an environment that includes referenced documents, such as the Web for example. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventor regards his invention as any patentable subject matter described.

In the following, definitions that may be used in the specification are provided in §4.1. Then, environments in which, or with which, embodiments consistent with the present invention may operate are described in §4.2. Thereafter, exemplary embodiments consistent with the present invention are described in §4.3. An example illustrating operations in an exemplary embodiment consistent with the present invention is provided in §4.4. Finally, some conclusions regarding the present invention are set forth in §4.5.

§4.1 Definitions

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as extensions of such information (e.g., information derived from related information). An example of document derived information is a classification based on textual content of a document. Examples of document related information include document information from other documents with links to the instant document, as well as document information from other documents to which the instant document links.

An "item" is anything referenced from a document. An item may be a document, such as a Web page for example.

Content from a document may be rendered on a "content rendering application or device." Examples of content rendering applications include an Internet browser (e.g., Firefox, Explorer, Netscape, etc.), a media player (e.g., an MP3 player, a Realnetworks streaming audio file player, etc.), a viewer (e.g., an Abobe Acrobat pdf reader, Picasa digital picture viewer, etc.), etc.

A "reference" is a link of an item, and often has a summary of information in the linked item.

A "referenced item" is the item that a reference links to. (See, e.g., state 120 of FIG. 1.)

A "persistent reference" is a reference to an item that is rendered to the user persistently (e.g., substantially continuously displayed), even when the user moves from the rendering of one item to the rendering of other items.

A "designated item" is an item that is associated with a persistent reference. (See, e.g., state 140 of FIG. 1.)

An item that had previously been designated (and therefore associated with an associated persistent reference) may be removed from the "designated" category, resulting in the elimination of the associated persistent reference.

A "selected item" is one that is rendered to the user, such a selected Web page rendered on a browser. For example, a user can chose to render an item by selecting a reference to the item. (See, e.g., state 130 of FIG. 1.) If the selected item was a "designated item," the resulting item may be referred to as a "selected designated item." (See, e.g., state 150 of FIG. 1.)

A "selected designated item" is an item that is rendered to the user upon the activation of a persistent reference to the item.

Figure 2:
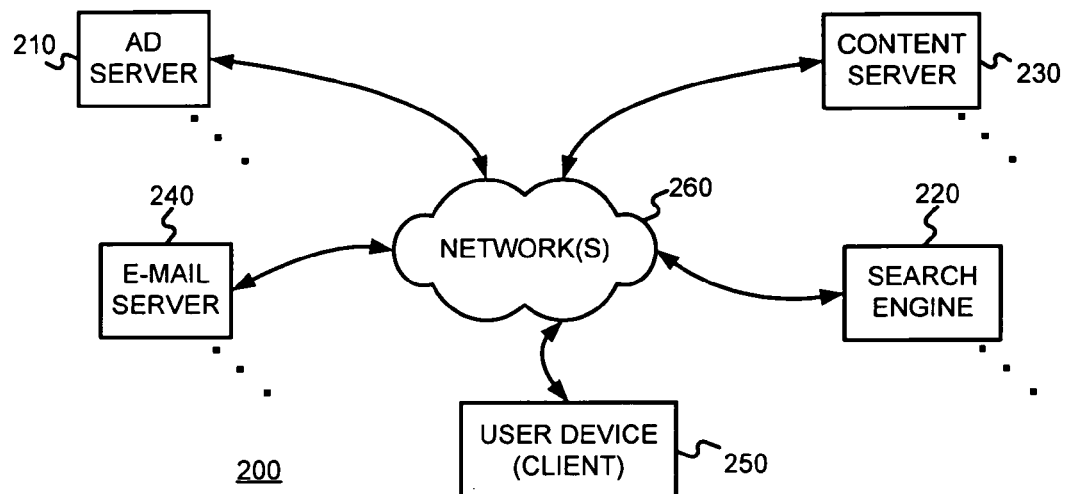
FIG. 2 illustrates an environment in which, or with which, exemplary embodiments consistent with the present invention may operate.

§4.2 Exemplary Environments in which, or with which, Exemplary Embodiments Consistent with the Present Invention May Operate FIG. 2 illustrates an environment 200 in which, or with which, embodiments consistent with the present invention may be used. A user device (also referred to as a "client" or "client device") 250 may include a browser facility (such as the Firefox browser from Mozilla, the Explorer browser from Microsoft, the Opera Web Browser from Opera Software of Norway, the Navigator browser from AOL/Time Warner, etc.), some other content rendering facility, an e-mail facility (e.g., Outlook from Microsoft), etc. A search engine 220 may permit user devices 250 to search collections of documents (e.g., Web pages). A content server 230 may permit user devices 250 to access documents. An e-mail server (such as Gmail from Google, Hotmail from Microsoft Network, Yahoo Mail, etc.) 240 may be used to provide e-mail functionality to user devices 250. An ad server 210 may be used to serve ads to user devices 250. For example, the ads may be served in association with search results provided by the search engine 220. Alternatively, or in addition, content-relevant ads may be served in association with content provided by the content server 230, and/or e-mail supported by the e-mail server 240 and/or user device e-mail facilities.

§4.3 Exemplary Embodiments Consistent with the Present Invention

Figure 3:
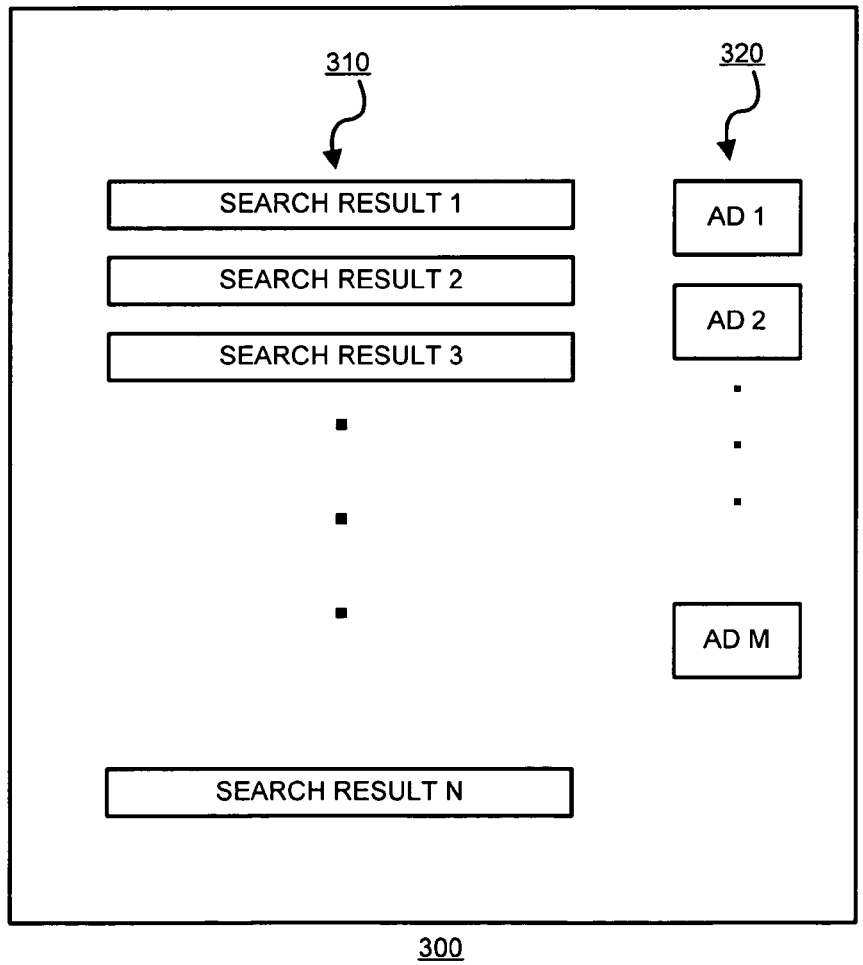
FIG. 3 is an exemplary environment, including a Web page having search result references and ad references, in which embodiments consistent with the present invention may be used.

FIG. 3 is an exemplary environment, including a Web page 300 having search result references 310 and ad references 320, in which embodiments consistent with the present invention may be used. Such a Web page 300 may be rendered when a user submits, via an Internet browser on a user device (Recall, e.g., 250 of FIG. 2.), a search request to a search engine (Recall, e.g., 220 of FIG. 2.). "N" search results 310 are displayed along with the display of "M" ads 320. Each of the search results 310 may be a few (e.g., four) lines and each may include a reference to an item that was determined to be relevant by the search engine (and might include other references, such as to similar items, cached items, etc.). For example, search result 1 could include a reference (e.g., a hyper-text link) to an article in the New York Times.

Each of ads 1-M could include an ad creative (e.g., text, image, graphic, animation, audio and/or video elements conveying a marketing message) and a reference (e.g., a hyper-text link) to the sponsor's Web pages (and might include other references to other Web pages). For example, ad 2 could be an advertisement for a local car dealer and could include a reference (e.g., hyper-link) to the car dealer's home page or to a particular promotion by the dealership, described in a particular Web page.

Using embodiments consistent with the present invention, at least one of the search results and/or ads may be automatically designated for browsing of the referenced items in those search result(s) and/or ad(s). This automatic designation could be supplemented by manual user designations and/or de-designations. As another example, this designation could be effected by a user defined area (e.g., block, circle, etc.). In this way, a user can designate multiple items without needing to repeat a designation input sequence. In response to such a designation, a persistent reference would be rendered on the display (e.g., on the Web page). One example of a persistent reference consistent with the present invention would be a tab containing one or more keywords from the reference. Additional designations would result in the display of additional persistent references.

For example, both the reference to the article in the New York Times and to similar pages in search result 1 could be automatically designated. In this case, two tabs would be displayed to the user along with search results 1-N and ads 1-M. Additionally, the reference to the car dealer's promotion in ad 2 could be automatically designated, and a third tab representing that link would be displayed to the user. (See, e.g., the transition from state 120 to state 140 in FIG. 1.)

If the user then selected (such as by a "left" mouse click) a non-designated reference on the Web page, the referenced item would be displayed, along with the three tabs for the designated references. (See, e.g., state 130 of FIG. 1.) If the user then selected a reference on that Web page, the display including resultant next Web page would again include the three tabs (persistent references) representing the designated items.

If the user then selected one of the tabs (such as by a "left" mouse click on the tab), the designated item referenced by that tab would be rendered to the user, and the other two tabs (and perhaps the tab of the "selected designated item," perhaps with a different "style") would also continue to be displayed. (See, e.g., state 150 of FIG. 1.) If the user then selects a reference on that Web page, the referenced item would be shown, along with the original three tabs.

If one of the designated items is de-designated, the associated tab would be removed from subsequent display screens. (See, e.g., transition from state 140 to state 120, and transition from state 150 to state 130 in FIG. 1.)

As can be appreciated from the foregoing example, designating items or references provides a user with easy access to each of the items referenced on the initial search results page, such as those items which are likely to be of interest to the user.

In a further embodiment consistent with the present invention, upon the designation of a referenced item, the item could be downloaded and stored (pre-fetched) for subsequent use. This could take place in the background while the user is viewing a selected item. Such pre-fetching allows the other designated items to be rendered quickly upon selection, since they don't need to be downloaded.

§4.3.1 Exemplary Methods

Figure 4:
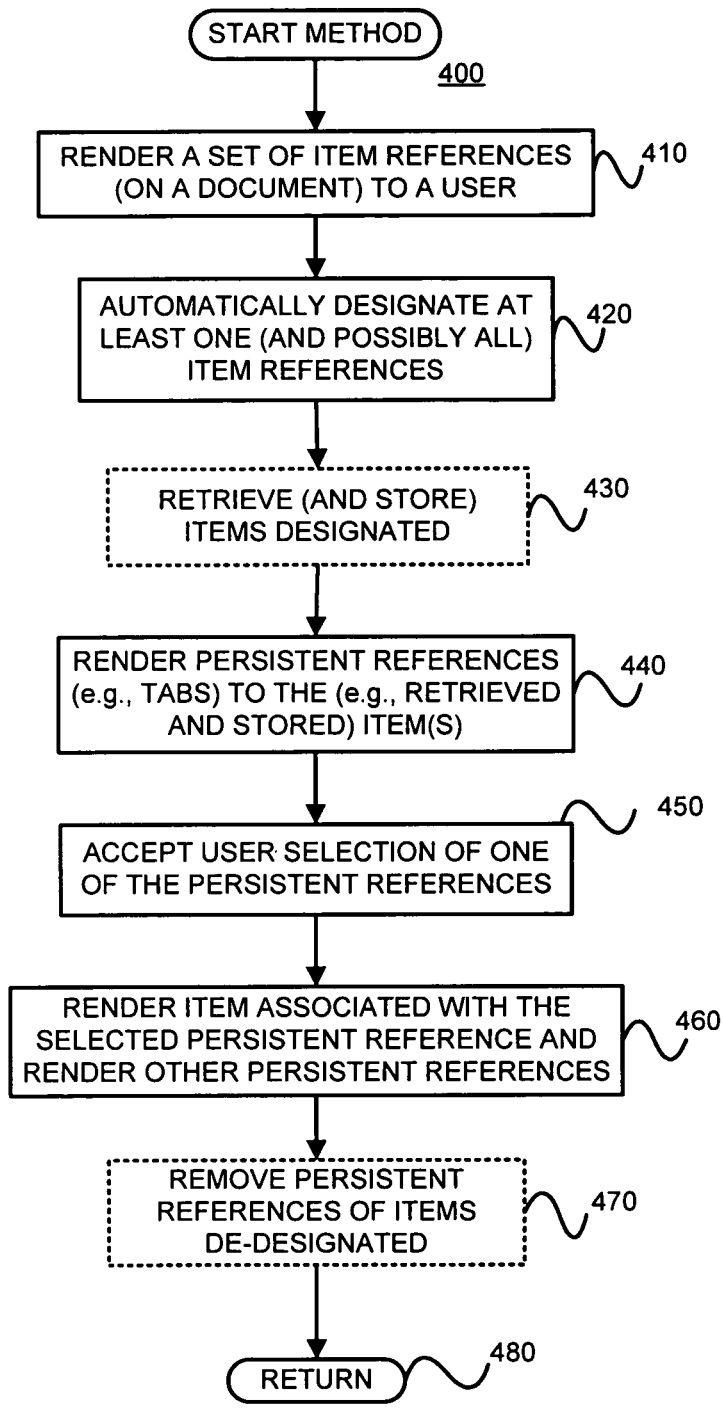
FIG. 4 is a flow diagram of an exemplary method that may be used to help a user to browse more than one item, such as Web page documents, in a manner consistent with the present invention.

FIG. 4 is a flow diagram of an exemplary method 400 that may be used to help a user browse more than one item, such as Web page documents, in a manner consistent with the present invention. At block 410 a set of item references are rendered (e.g., on a document) to a user. At block 420, one or more item references are automatically designated. At block 430, the designated item(s) may be retrieved and stored (pre-fetched). At block 440, persistent references (e.g., tabs) to the (e.g., retrieved and stored) designated items are rendered. At block 450, a user selection of one of the persistent references is accepted. Then, at block 460, the item associated with the selected reference is rendered, along with the other persistent references. As shown at block 470, a persistent reference may be removed by de-designating the item (e.g., automatically, or in response to a manual user de-designation input operation).

The user may select another persistent reference at step 450. The selection of a non-persistent reference at any time would not disrupt the general flow of the method 400 of FIG. 4 (and the rendering of persistent references).

Figure 5:
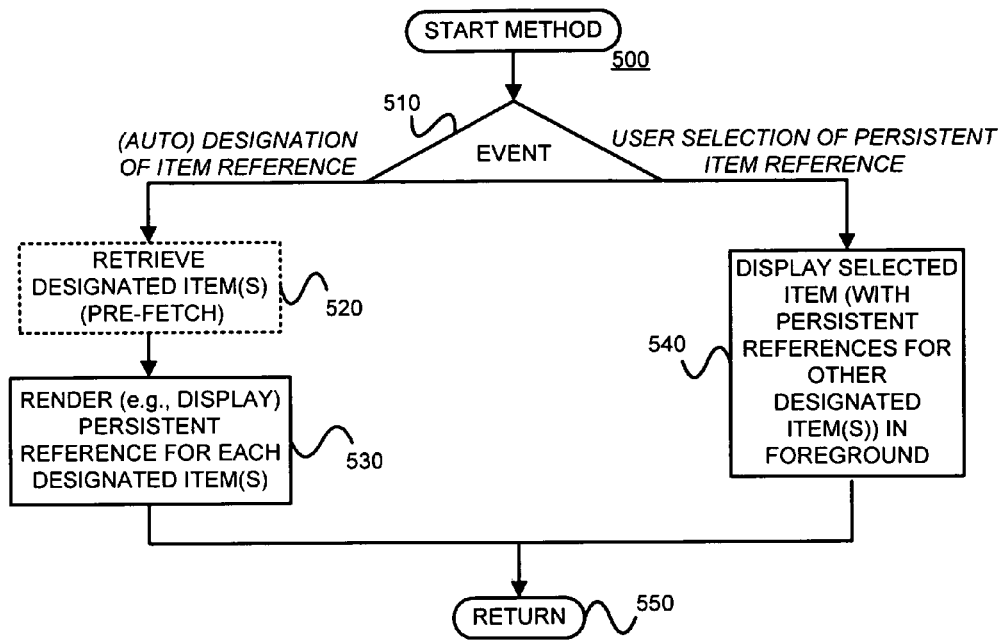
FIG. 5 is a flow diagram of an exemplary method that may be used to change item state information in a manner consistent with the present invention.

FIG. 5 is a flow diagram of an exemplary method 500 that may be used to change item state information in a manner consistent with the present invention. At event block 510, it is determined whether a an item reference has been designated, or whether a user has selected a persistent item reference. (The options of selecting a non-persistent item reference or de-designating a persistent item reference are not shown here to simplify the drawing.) If an item reference is designated, (some or all of) the designated item(s) may be retrieved and stored (pre-fetched) for later rendering at block 520. Before, after, or substantially simultaneously with block 520, the persistent reference for that item, such as a tab, may be added to the existing set of persistent item references for previously designated items and the persistent reference for each of the designated items may be rendered at block 530. (Recall, e.g., state 140 of FIG. 1.)

Referring back to event block 510, if a user selects an existing persistent item reference, the referenced item may be retrieved and displayed along with the other existing persistent references, at block 540. (Recall state 150 of FIG. 1.) The persistent references may be arranged on the display in many alternative ways. For example, one could be displayed in the foreground and the other(s) in the background. Other arrangements may be suitable so long as the "selected" item is visible and the persistent item references are also visible and available for user selection.

FIG. 1 is a state diagram showing the various states that an item can be in, as well as item state transitions, consistent with the present invention. One state might be a (non-persistent) referenced item at state 120. The reference to the item might be displayed on a document currently being displayed. For example, there could be a reference to a Jiffy Lube home page on a search results page. At this point, the Jiffy Lube home page is a "referenced item."

The item's reference may be automatically designated (or perhaps designated by a user input), in which case the item may be a "referenced item" at state 140. This may result in the display of a persistent reference to the Jiffy Lube home page, such as with a tab. Item state 140 could revert back to state 120 if the persistent reference to the Jiffy Lube home page where de-designated, in which case the only reference to the Jiffy Lube home page would be a non-persistent reference. In this case, the associated Jiffy Lube tab would be removed from the display.

Referring back to state 140, the persistent reference (tab) could be "selected" by a user (such as by left-clicking the tab with a mouse), resulting in the item transition to the "selected designated item" state 150. This may cause the display of the item (Jiffy Lube page) along with the persistent references of the remaining designated items, in state 150. The tab, or persistent reference, of the selected designated item could also continue to be displayed, as shown by element 1115 FIG. 11.

At this point, the item may return to state 140 if a user selects another (e.g., persistent) reference of another (e.g., designated) item. The persistent reference to the Jiffy Lube home page would be included with the other persistent references.

Referring back to item state 150, the displayed Jiffy Lube home page could be "de-designated". If the Jiffy Lube home page item is de-designated, the Jiffy Lube home page would simply become a "selected" item as show by state 130. The "selected" item (e.g., the Jiffy Lube home page) would still be displayed, but the persistent reference (e.g., the tab) to the Jiffy Lube home page would no longer be displayed.

Another way to reach item state 130 would be for a user to "select" the Jiffy Lube reference at state 120. In this case, the Jiffy Lube home page would not be a designated item, but would be displayed on the browser, along with the persistent references to the designated items.

At item state 130, the Jiffy Lube home page could be designated. This would result in the Jiffy Lube home page entering state 150, which would continue to display the Jiffy Lube home page, along with the persistent references of the designated items.

Referring back to item state 130, a user could select a reference to another item that has no reference to the Jiffy Lube home page. As shown in state 110, the Jiffy Lube home page would be considered to be a "presently unreferenced item." The other (just selected) item would be displayed, along with any persistent references for designated items. At this point, the Jiffy Lube item would neither be rendered, nor referenced, on the display. If at some future time the user loaded a document that contains a reference to the Jiffy Lube home page, the state of the Jiffy Lube home page item would be that of state 120.

In at least one embodiment consistent with the present invention, a reference can be simultaneously "designated" and "selected" (e.g., due to a special user input), resulting in the item being a "selected designated" item which is displayed along with the persistent references. (See transition from state 120 to state 150.)

§4.3.2 Exemplary Apparatus

Figure 6:
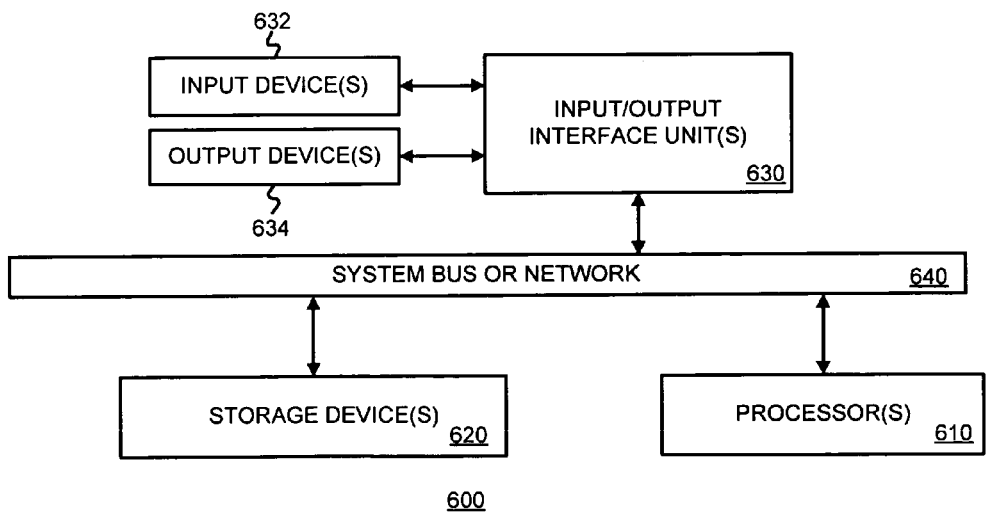
FIG. 6 is a block diagram of exemplary apparatus that may be used to perform operations and/or store information in exemplary embodiments consistent with the present invention.

FIG. 6 is high-level block diagram of a machine 600 that may perform one or more of the operations discussed above. The machine 600 includes one or more processors 610, one or more input/output interface units 630, one or more storage devices 620, and one or more system buses and/or networks 640 for facilitating the communication of information among the coupled elements. One or more input devices 632 and one or more output devices 634 may be coupled with the one or more input/output interfaces 630.

The one or more processors 610 may execute machine-executable instructions (e.g., C or C++ running on the Solaris operating system available from Sun Microsystems Inc. of Palo Alto, Calif., the Linux operating system widely available from a number of vendors such as Red Hat, Inc. of Durham, North Carolina, Java, assembly, Perl, etc.) to effect one or more aspects of the present invention. At least a portion of the machine executable instructions may be stored (temporarily or more permanently) on the one or more storage devices 620 and/or may be received from an external source via one or more input interface units 630.

In one embodiment, the machine 600 may be one or more conventional personal computers, mobile telephones, PDAs, etc. In the case of a conventional personal computer, the processing units 610 may be one or more microprocessors.

The bus 640 may include a system bus. The storage devices 620 may include system memory, such as read only memory (ROM) and/or random access memory (RAM). The storage devices 620 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media, etc.

A user may enter commands and information into the personal computer through input devices 632, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 610 through an appropriate interface 630 coupled to the system bus 640. The output devices 634 may include a monitor or other type of display device, which may also be connected to the system bus 640 via an appropriate interface. In addition to (or instead of) the monitor, the personal computer may include other (peripheral) output devices (not shown), such as speakers and printers for example.

The various operations described above may be performed by one or more machines 600, and the various information described above may be stored on one or more machines 600. Referring back to FIG. 2, The ad server 210, search engine 220, content server 230, e-mail server 240, and/or user device 250 may include one or more machines 600.

§4.3.3 Refinements and Alternatives

§4.3.3.1 Automatically Designating a Reference

Referring back to block 420 of FIG. 4, whether or not to automatically designate an item may be determined using one or more of various factors. In some embodiments consistent with the present invention, one factor may be whether or not a user has a preference for automatic designations, or perhaps preferences for automatic designations of certain types of items (e.g., sets of ads, sets of search results, etc.). For example, a user may prefer to have search results automatically designated, or the N best (e.g., the N most relevant) search results to be automatically designated. Similarly, a user may prefer to have search results from certain search engines (e.g., google.com) designated, but not from others. As another example, a user may prefer to have advertisements automatically designated, or the M best advertisements to be designated. Similarly, a user may prefer to have advertisements from certain advertising networks (e.g., AdWords, AdSense) designated, but not ads from other advertising networks. User preferences may be combined. For example, a user may prefer to have all search results from the Google search engine, but only the top three (3) ads, designated.

Such preferences may be provided by the user expressly. A special user interface may be provided for this purpose. Alternatively, or in addition, user preferences may be inferred from past user behavior. For example, if a user frequently navigates back and forth between a search results page and the top P ads, the top P ads may be designated automatically. Alternatively, or in addition, user preferences may be inferred from the past behavior of other users, such as users considered to be similar to the instant user.

In some embodiments consistent with the present invention, whether an item is to be automatically designated may be determined using one or more of a relevance of the item or item reference (e.g., to information of a user search query, from concepts or topics of a presently loaded document, etc.). In some embodiments consistent with the present invention, whether an ad is to be automatically designated may be determined using one or more of a relevance of the ad (e.g., to search query information, to contents of a Webpage, to a location, to a user, to a client device type, etc.), offer information (e.g., a bid) associated with the ad, a surcharge that the advertiser agrees to pay for a persistent reference, past performance of the ad (e.g., a selection-to-impression ratio, a conversion-to-impression ratio, etc.), etc.

A designated item may be automatically de-designated. This may occur, for example, when a user navigates to one or more other documents, and/or selects one or more other tabs, and/or enters one or more new search queries without selecting the designated items. A designated item may be de-designated to make room for a new, better (e.g., in terms of one or more of relevance, score, "freshness") designated items. For example, a browser might set a limit of ten (10) tabbed designated items. If the browser already has ten tabbed designated items, but has two new very relevant items, it may displace two of the existing designated items. Replacement of such a designated item (i.e., de-designation of an items and designation of a replacement item) may occur under different circumstances in different exemplary embodiments consistent with the present invention. For example, when the number of designated items is at a maximum permitted level, a new item may be designated and replace a designated item to be de-designated if the new item has a higher score than the designated item. In other embodiments, such replacement might occur only if the new item has a much higher score (e.g., by a factor of A, by a constant of B, etc.) than the designated item. That is, such embodiments may be biased against replacing existing designated items.

In some embodiments consistent with the present invention, it may be more difficult to de-designate a manually designated item than an automatically designated item.

§4.3.3.2 Display of Designated References

In most of the examples described above, the persistent reference was described as a tab. Alternatively, the persistent references could be some other user selectable object that is persistently displayed (e.g., a dial, a set of links, a set of windows, etc.). Such persistent references may be displayed in the foreground of a displayed document or window, in browser chrome, along a border of a window, in the margin of a window, or adjacent to the perimeter of a window. Other beneficial methods of persistently rendering references to designated items, available for selection by a user, will be apparent to those skilled in the art.

The persistent references may include a descriptive label such as text. For example, anchor text extracted from the reference may be used as such a descriptive label.

Persistent references to different types of items, or derived from different types of references (referred to generally as "different types of persistent references"), may be displayed differently and/or in different areas. For example, persistent references to search results may be displayed in a first margin of a document, while persistent references to advertisements may be displayed in a second margin of the document. As another example, persistent references to search results may be displayed with a first background color, while persistent references to advertisements may be displayed in with a second background color. As yet another example, persistent references of manually designated items may be displayed as a set of tabs (perhaps with a first background color) adjacent to a document margin, while persistent references of automatically designated advertisements may be displayed as a set of tabs adjacent to and layered under the first set of tabs (perhaps with a second background color). Various different combinations of the foregoing display schemes may be used to display various different types of persistent references.

§4.3.3.3 Other Operations

A pre-fetch operation may retrieve and store all of a designated item or a part or portions of a designated item.

The examples above generally refer to the results of a Web search. However, anytime a user is presented with a document having item references, the present invention could be used to allow the user to designate those references which the user wants to be readily available for future selection.

Figure 7:
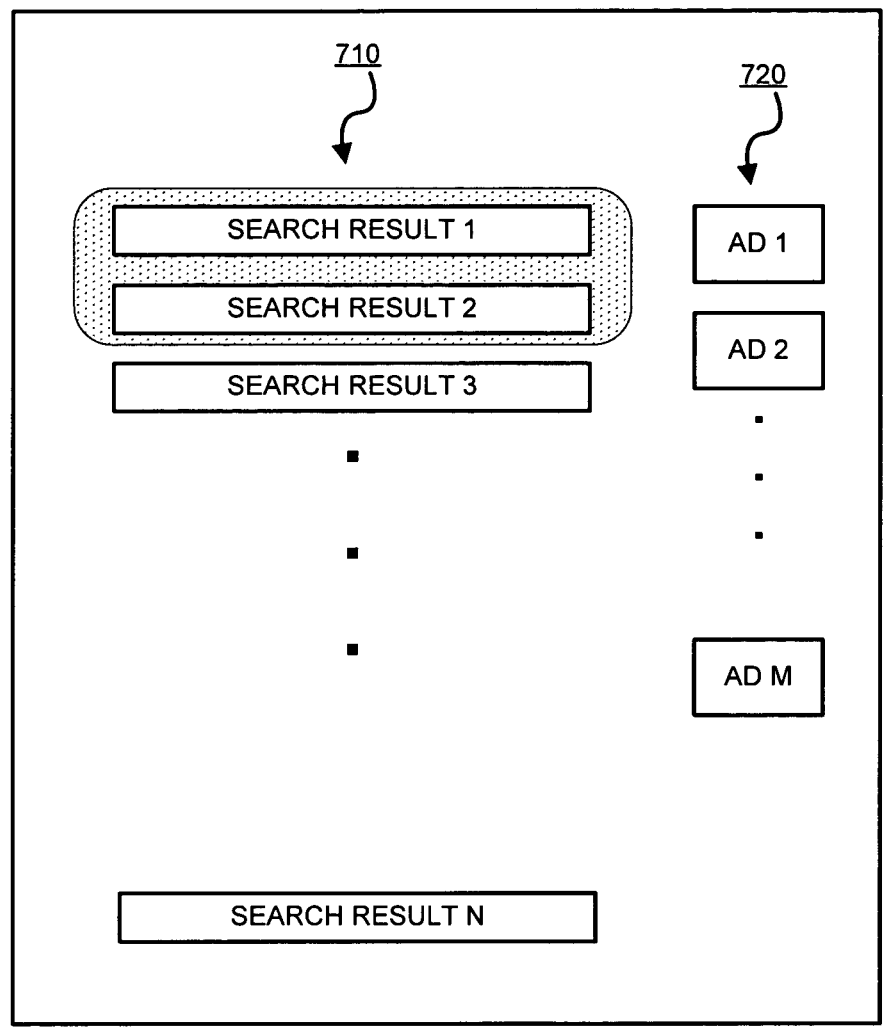
FIGS. 7 and 8 illustrate the designation of adjacent (contiguous) homogeneous item references in a Web page like that of FIG. 3.
Figure 8:
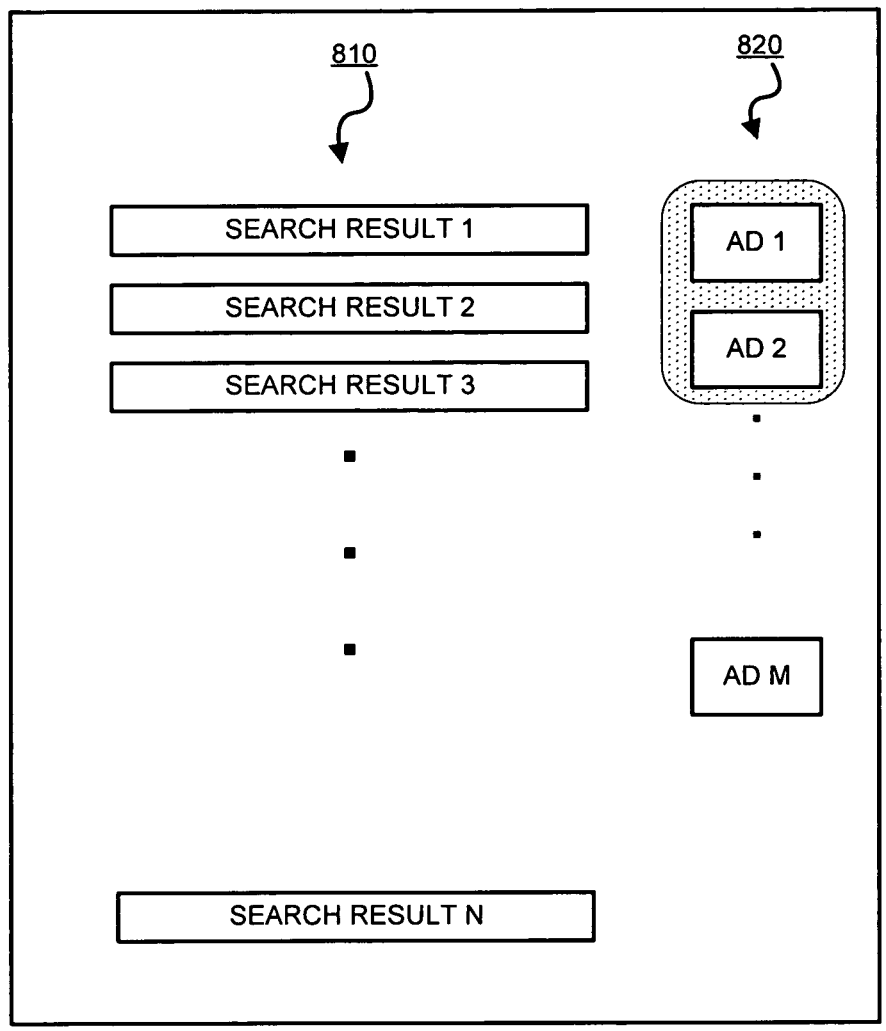

§4.4 Examples of Operations in an Exemplary Embodiment Consistent with the Present Invention FIGS. 7 and 8 illustrate the manual user designation of adjacent (contiguous) homogeneous item references in a Web page like that of FIG. 3 without requiring the user to repeat a designation input. Suppose, for example, that the user performs a search for "VCR." Further suppose that Search Result 1 is a link to Best Buy, Search Result 2 is a link to CompUSA, and Search Result 3 is a link to the history of VCR's. Suppose further that Ad 1 is an advertisement for a sale at Radio Shack, Ad 2 is an ad for Sears, and ad "M" is an ad for Target.

In FIG. 7, if the user just wants to see the VCR selections at Best Buy and CompUSA, he or she could designate Search Results 1 and 2 (e.g., either right click on Search Result 1 and right click on Search Result 2, or right click on Search Result 1 and "drag" the cursor to Search Result 2 (sometimes referred to as "area blocking")). In either event, persistent references (e.g., tabs) would be established for references in Search Results 1 and 2. Those persistent references could then be displayed on the current Web page and subsequent Web pages. Note that if a search result 710 or an ad 720 has more than one reference, a first or primary reference may be designated if an area blocking designation is performed. Alternatively, more than one (e.g., all) of the references may be designated.

FIG. 8 illustrates the manual user designation of contiguous ad references 820. Suppose that the user wanted to browse the Radio Shack and Sears items, but not the other referenced items. The user could designate these references for persistent display, for example, by using the techniques described above in relation to FIG. 7.

Figure 9:
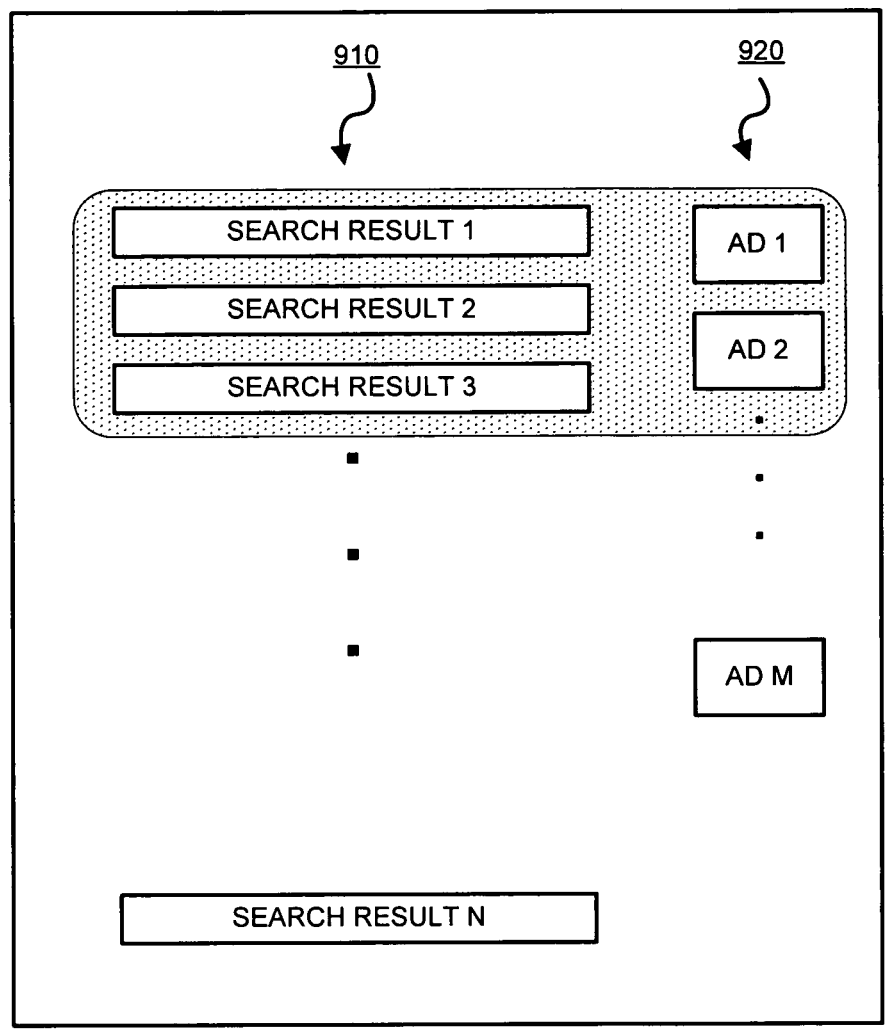
FIG. 9 illustrates the designation of adjacent (contiguous) heterogeneous item references in a Web page like that of FIG. 3.

FIG. 9 illustrates the manual user designation of adjacent (contiguous) heterogeneous item references 910 and 920 in a Web page like that of FIG. 3. In this case, the user might want to view the items referenced by first two (2) search result pages and the first ad, but not the other referenced items. The designation of these items could again be accomplished in any of the ways described above in relation to FIG. 7 (such as designations using a special "click" or using special area blocking).

Figure 10:
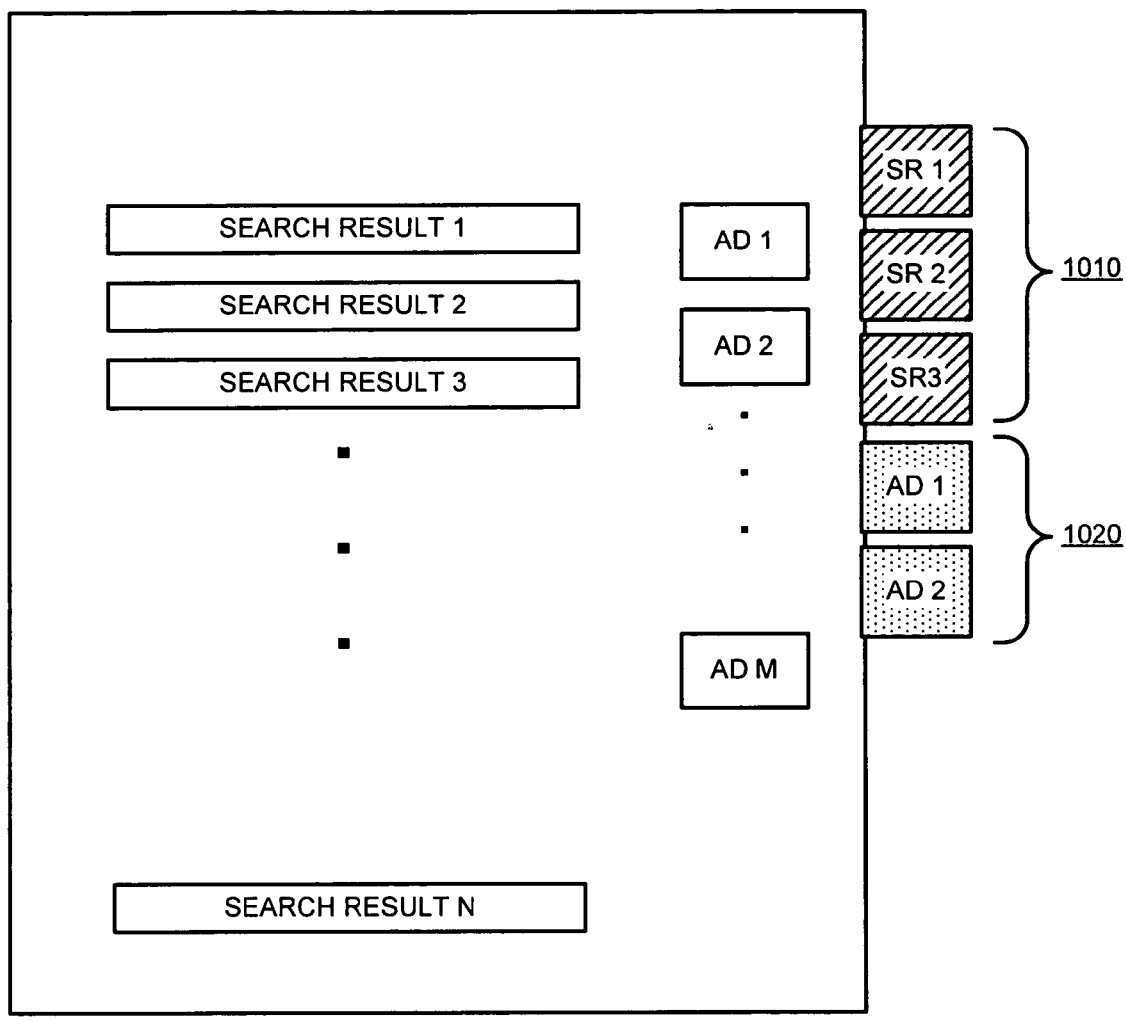
FIGS. 10-12 illustrate different alternative displays of designated search result references and advertisement references.

FIG. 10 illustrates the display of automatically designated search result references and ad references. In this example, only the top three of the N search results were automatically designated and only the top two of M ads were automatically designated (e.g., because only they scored high enough relative to a fixed score threshold, because only they scored high enough relative to the scores of the other search results or other ads, because the user specified that they prefer to have the top three search results specified, because the user typically selects the top two ads, etc.). In this example, the designated search result references 1010 and ad references 1020 are depicted with different colored tabs in the right margin. In this example, persistent references of the same type are arranged adjacent to one another (without an intervening reference of another type), but this is not necessary in at least some embodiments consistent with the present invention.

Figure 11:
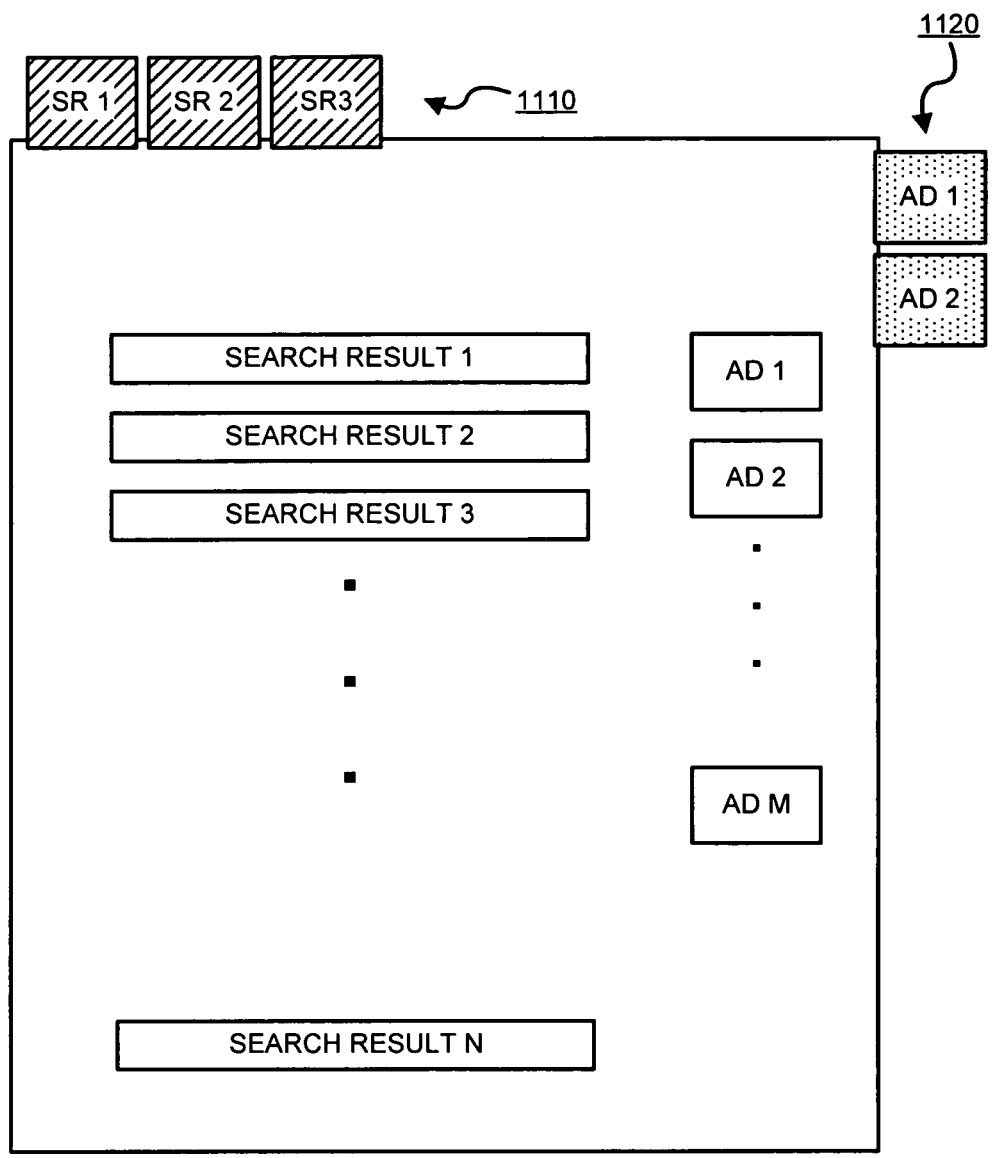
Figure 12:
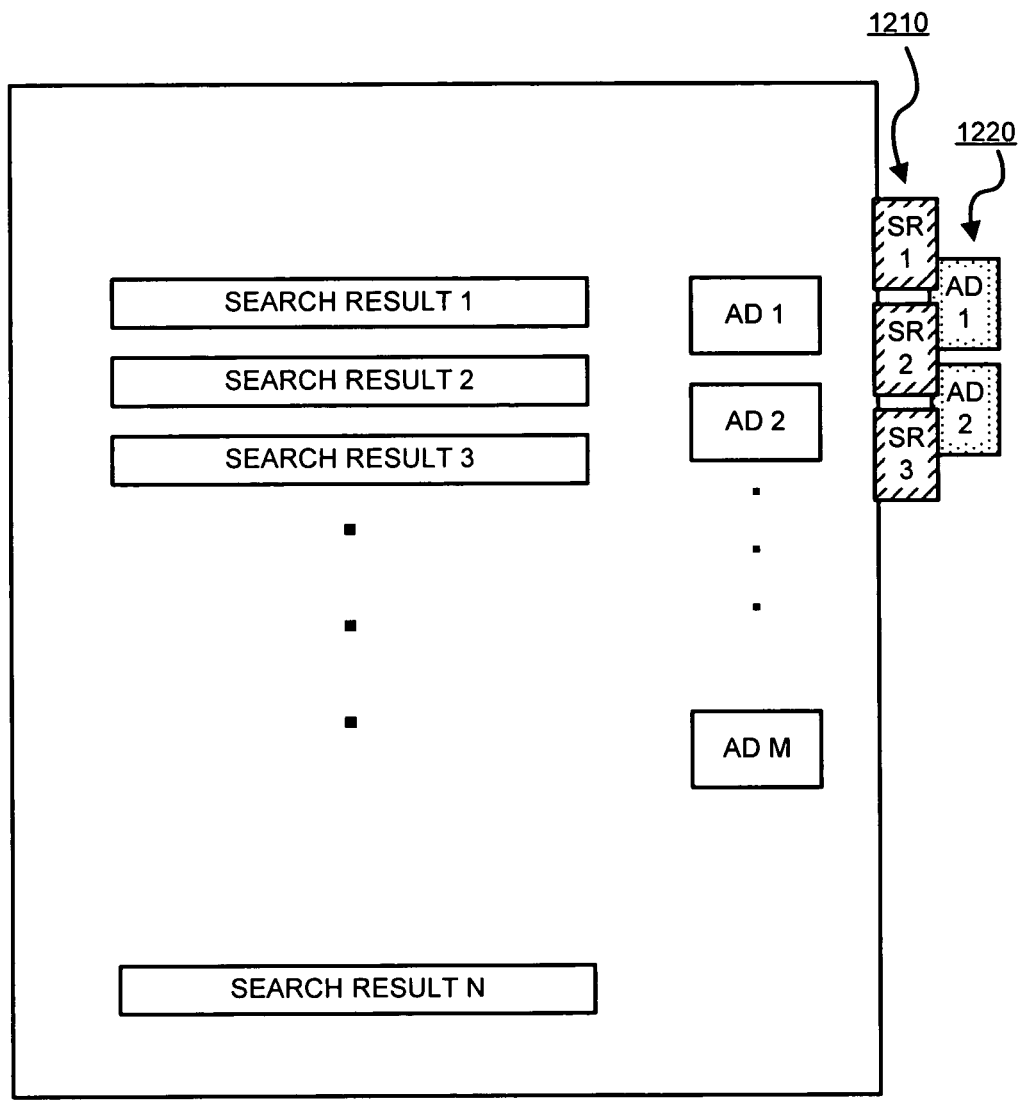

In the alternative display 1100 of FIG. 11, the designated search result references 1110 and ad references 1120 are depicted in different margins. In the alternative display 1200 of FIG. 12, the designated search result references 1210 and ad references 1220 are depicted in different layers with different colors.

Naturally, other combinations of such display options are possible. Further, although the different types of designated references in the foregoing examples concerned designated search references versus designated ad references, other different types of references (e.g., those that were automatically designated versus those that were manually designated) may be distinguished from one another (e.g., by being rendered at different locations, and/or with different background colors).

Other beneficial methods of designating displayed references will be apparent to those skilled in the art, such as the use of designation "buttons" next to each reference, the use of special user inputs (e.g., combined keyboard keys entries and mouse clicks).

Figure 13:
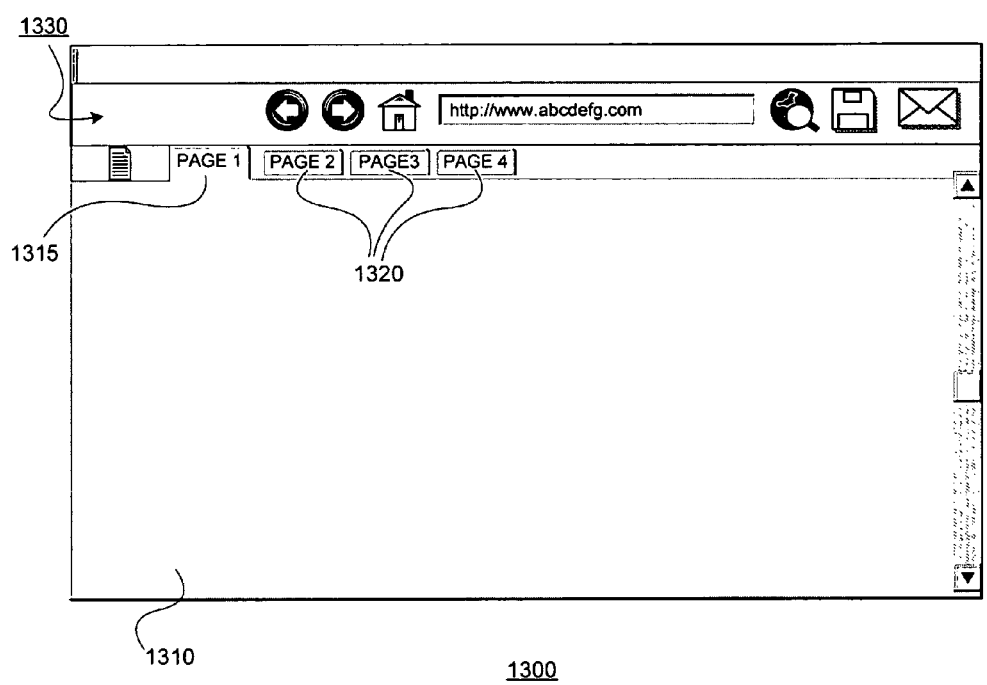
FIG. 13 illustrates an exemplary browser interface which embodies persistent item references as tabs.

FIG. 13 illustrates an exemplary browser interface which embodies persistent item references as tabs. In this example, the persistent reference tabs would be depicted in the "chrome" 1330 of the display 1300. The "selected" (and designated) item would be rendered as 1310, such as the Best Buy page, with its associated persistent reference 1315 as the tab "Page 1" (which could depict "Best Buy" in this example). The other previously designated items would be displayed as persistent references (tabs) 1320 (such as CompUSA, Radio Shack, etc.). This would allow the user to select any reference on the rendered page 1310, or select one of the other persistent references 1320 (Page 2, Page 3, or Page 4).

§4.5 Conclusions

As can be appreciated from the foregoing description, the present invention allows one or more references on a document to be automatically designated for future browsing. Alternatively, or in addition, a user can designate more than one reference without needing to repeat a designation input. The designated references can be advantageously shown as references, which would be persistently rendered along with any subsequently viewed documents. The user can thereby browse through multiple documents, and at any point select one of the (e.g., originally) designated references via its persistent reference, without navigating back to the original document that had the reference.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

As can be appreciated from the foregoing, some embodiments consistent with the present invention may be used to help users to navigate between items (e.g., referenced documents) of interest to them quickly. In at least some embodiments consistent with the present invention, while a user is viewing one item, the other designated items can be loaded (e.g., pre-fetched) for later viewing.

What is claimed is:

1. A computer-implemented method comprising:
   a) rendering, with a computer system including at least one computer, each of the at least one computer including at least one processor and a memory storing program instructions execute by the at least one processor, a document, including a set of item references, to a user;
   b) automatically, with the computer system, designating at least one of the item references thereby defining at least one designated item reference;
   c) adding, with the computer system, a persistent item reference for each of the defined at least one designated item reference; and d) rendering, with the computer system, the at least one persistent item reference.

2. The computer-implemented method of claim 1 further comprising:
   e) accepting, with the computer system, a user selection of one of the rendered at least one persistent item reference; and
   f) rendering, with the computer system, both:
      i) the item associated with the selected persistent item reference, and
      ii) any other of the at least one persistent item reference.

3. The computer-implemented method of claim 2, further comprising:
   loading and storing, with the computer system, at least part of an item corresponding to a designated item reference before user selection of an item reference corresponding to the item.

4. The computer-implemented method of claim 1, wherein each of the at least one persistent item reference is a visually perceivable and selectable tab.

5. The computer-implemented method of claim 4, wherein each of the at least one tab is rendered in chrome of a browser.

6. The computer-implemented method of claim 1, wherein each of the at least one displayed persistent item reference is visually perceivable and rendered in chrome of a browser.

7. The computer-implemented method of claim 1, wherein each of the at least one displayed persistent item reference is visually perceivable and rendered in at least one margin of a window.

8. The computer-implemented method of claim 1, wherein each of the at least one displayed persistent item reference is visually perceivable and different types of persistent item references are rendered in different margins of a window.

9. The computer-implemented method of claim 1, wherein each of the at least one displayed persistent item reference is visually perceivable and different types of persistent item references are rendered with different background colors.

10. The computer-implemented method of claim 1, wherein each of the at least one displayed persistent item reference is visually perceivable and rendered adjacent to a perimeter edge of a browser window.

11. The computer-implemented method of claim 1, wherein the act of automatically designating an item reference includes, for each of the item references of the set,
   i) scoring the item reference, and
   ii) determining whether or not to designate the item reference using the score.

12. The computer-implemented method of claim 11, wherein the act of scoring the item reference is based on a relevance of the item reference to information of a search query.

13. The computer-implemented method of claim 11, wherein the act of scoring the item reference is based on a relevance of the item reference to content of the document.

14. The computer-implemented method of claim 1, wherein the document is a Web page.

15. The computer-implemented method of claim 1, wherein the document is a search results Web page.

16. The computer-implemented method of claim 15, wherein the item references include links to documents that are relevant to a search query.

17. The computer-implemented method of claim 15, wherein the item references include advertisements with links to advertiser landing documents.

18. The computer-implemented method of claim 15, wherein the item references include advertisements with links to advertiser-defined landing documents.

19. The computer-implemented method of claim 1, wherein the act of automatically designating an item reference includes determining whether or not to designate the item reference based on whether or not a user has a user preference for automatic designations.

20. The computer-implemented method of claim 19, wherein the user preference had been expressly provided by the user.

21. The computer-implemented method of claim 19, wherein the user preference is inferred from past user behavior.

22. The computer-implemented method of claim 1, wherein the act of automatically designating an item reference includes
   i) determining a type of item referenced, and
   ii) determining whether or not the user has a preference for automatic designations of the determined type of item.

23. A computer-implemented method comprising:
   a) rendering, with a computer system including at least one computer, each of the at least one computer including at least one processor and a memory storing program instructions execute by the at least one processor, a set of item references to a user;
   b) accepting, with the computer system, a user designation of at least two of the item references via a single, non-repeated, designation user input thereby defining at least two designated item references;
   c) adding, with the computer system, at least two persistent item references for the at least two designated item references;
   d) rendering, with the computer system, each of the at least two persistent item references;
   e) accepting, with the computer system, a uses selection of one of the at least two persistent item references; and
   f) rendering, with the computer system, both:
      i) the item associated with the selected persistent item reference, and
      ii) any other of the at least two persistent item reference.

24. The computer-implemented method of claim 23, wherein the user designation of at least two item references includes an area blocking input operation.

25. Apparatus comprising
   a) one or more processors;
   b) at least one input device; and
   c) one or more storage devices storing processor-executable instructions which, when executed by one or more processors, perform a method of:
      1) rendering a document, including a set of item references, to a user,
      2) automatically designating at least one of the item references thereby defining at least one designated item reference,
      3) adding at least one persistent item reference for each of the defined at least one designated item reference, and
      4) rendering the at least one persistent item reference.

26. The computer-implemented method of claim 1, wherein the act of rendering the at least one persistent item reference is performed without requiring user input after the document is rendered.

27. The apparatus of claim 25, wherein the act of rendering the at least one persistent item reference renders the at least one persistent item reference without requiring user input after the document is rendered.

\* \* \* \* \*